United States Patent Office 3,117,127
Patented Jan. 7, 1964

3,117,127
3- AND 4-ACETAMIDOPIPERIDINIUM HALIDES
Franklyn W. Gubitz, Nassau, N.Y., assignor to Sterling Drug Inc., New York, N.Y., a corporation of Delaware
No Drawing. Filed Feb. 27, 1961, Ser. No. 91,600
6 Claims. (Cl. 260—294)

This invention relates to compositions of matter classified in the art of chemistry as substituted piperidines and to processes for making such compositions.

The invention sought to be patented, in its composition aspect, is described as residing in the concept of a chemical compound having a molecular structure in which there is attached to a 3- or 4-acetamido-1-alkylpiperidine a lower-alkyl or lower-alkenyl radical on the piperidine ring nitrogen atom.

The invention sought to be patented, in its process aspect, is described as residing in the concept of embodying such a molecular structure in tangible form by the quaternization of an appropriate 3- or 4-acetamido-1-alkylpiperidine with a lower-alkyl or lower-alkenyl ester of a strong acid.

The subject matter as a whole is represented as being non-obvious to a person skilled in the art of organic chemistry because the physical embodiments possess the inherent applied use characteristics of having about one hundred times more anti-hypertensive activity, based on pharmacological evaluation by standard test procedure, than does the known 3-acetamido-1-methylpiperidine. The physical embodiments of the inventive concept have been demonstrated to possess hypotensive properties in living animals.

A preferred aspect of the invention relates to lower-alkyl and lower-alkenyl quaternary ammonium salts of compounds having the formulas

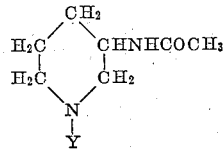

and

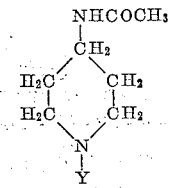

wherein Y is a lower-alkyl group having from one to three carbon atoms. Y thus includes such groups as methyl, ethyl, propyl and isopropyl.

The quaternary ammonium salts of the invention are those having anions which are therapeutically acceptable, e.g., the anions are innocuous to the host organism in therapeutic doses of the salts, so that the beneficial physiological properties inherent in the cations are not vitiated by side-effects ascribable to the anions. Acceptable anions include, inter alia, chloride, bromide, iodide, nitrate, sulfate, phosphate, acetate, quinate, lactate, tartrate, sulfonate, benzoate, and the like.

The quaternary ammonium salts of the invention are obtained by reacting a tertiary base of the above formulas with at least one molar equivalent of a lower-alkyl or lower-alkenyl ester of an inorganic acid or an organic sulfonic acid. The lower-alkyl or lower-alkenyl esters so used include such compounds as methyl chloride, methyl bromide, methyl iodide, ethyl bromide, propyl bromide, allyl chloride, allyl bromide, methyl sulfate, dimethyl sulfate, and the like. The reaction takes place by simple admixture of the tertiary-amine and the lower-alkyl or lower-alkenyl ester of a strong acid, preferably in an organic solvent inert under the conditions of the reaction. Exemplary of such inert solvents are the lower-alkanols, lower-aliphatic ethers, lower-aliphatic ketones, acetonitrile, dimethylformamide, and hydrocarbon solvents such as petroleum ether, benzene, toluene, and the like. Heating can be used to facilitate the reaction which occurs readily at temperatures of 50° C. to about 150° C. If a solvent is selected which boils in this range it is convenient to carry out the reaction at the reflux temperature. The quaternary ammonium salt separates directly or can be obtained by concentration of the solution.

It is possible to convert one quaternary ammonium salt into another in which the anion is different. If the anion of the quaternary ammonium salt forms a water-insoluble silver salt, which is true in the large majority of cases, the quaternary ammonium salt will react with silver oxide in aqueous medium to form the corresponding quaternary ammonium hydroxide in solution. The silver salt of the original anion separates as a precipitate and can be removed by filtration. The solution of the quaternary ammonium hydroxide can then be neutralized with any desired acid, weak or strong, to produce a new quaternary ammonium salt in which the anion is different from that of the original quaternary salt.

It is also possible to convert a quaternary ammonium salt of a compound having one of the above formulas with anion, X, into a compound where the anion, X', is different by contacting an aqueous solution of the former with a quaternary ammonium strong base anion exchange resin saturated with the anion, X'. This method is particularly useful for converting the iodide into the bromide or chloride, which avoids the use of the excessively volatile methyl bromide or methyl chloride which are necessary in the direct quaternization procedure.

Still another method for converting the compound where the anion is iodide to the compound where the anion is chloride or bromide comprises contacting the iodide with an alcoholic solution of hydrogen chloride or hydrogen bromide. Since hydrogen iodide is more insoluble than hydrogen chloride or hydrogen bromide, double decomposition will take place and the ions in solution will be exchanged. Similarly, the compound where the anion is bromide can be converted to the compound where the anion is chloride.

The prerequisite intermediate N-alkyl-3-acetamidopiperidines and N-alkyl-4-acetamidopiperidines are known classes of compounds. They can be prepared by reduction of the corresponding N-alkylpyridines.

The structures of the compounds of the invention are established by chemical analysis and by the preparative methods used in their synthesis.

The following examples will further illustrate the invention, without the latter being limited thereto.

EXAMPLE 1

*3-Acetamido-1,1-Diethylpiperidinium Bromide*

A mixture of 6.8 g. of 3-acetamido-1-ethylpiperidine and 8.8 g. of ethyl bromide in 50 ml. of isopropanol was refluxed for four hours. The excess ethyl bromide and most of the isopropanol were removed by distillation at reduced pressure and the residue cooled. The solid which separated was collected by suction filtration and dried at 80° C. in a drying pistol. There was thus obtained 4.5 g. of 3-acetamido-1,1-diethylpiperidinium bromide, M.P. 178–182° C. (corr.).

*Analysis*—Calcd. for $C_{11}H_{23}BrN_2O$: Br, 28.62; N, 10.03. Found: Br, 28.40; N, 9.84.

The minimum effective hypotensive dose (MEHD) of 3-acetamido-1,1-diethylpiperidinium bromide given subcutaneously in the renal hypertensive rat was found to be 0.01 mg./kg. The hypotensive effect lasted for forty-eight hours and the maximum drop in blood pressure occurred in twenty-four hours. The mouse intravenous toxicity was found to be 140 mg./kg.

EXAMPLE 2

3-Acetamido-1,1-Dimethylpiperidinium Bromide

Methyl bromide (7.6 g.) was bubbled into a hot solution of 6.25 g. of 3-acetamido-1-methylpiperidine. The addition took one hour after which the solution was cooled in an ice bath. The quaternary ammonium salt which separated was collected by filtration and washed with acetone and anhydrous ether. After recrystallization from isopropanol there was obtained 7.4 g. of 3-acetamido-1,1-dimethylpiperidinium bromide, M.P. 211–213° C. (corr.).

Analysis.—Calcd. for $C_9H_{19}BrN_2O$: Br, 31.82; N, 11.16. Found: Br, 31.60; N, 11.17.

The MEHD of 3-acetamido-1,1-dimethylpiperidinium bromide given subcutaneously in the renal hypertensive rat was found to be 0.01 mg./kg. The hypotensive effect lasted for more than forty-eight hours and the maximum drop in blood pressure occurred in twenty-four hours. The mouse intravenous toxicity was found to be 250 mg./kg.

EXAMPLE 3

3-acetamido-1-ethyl-1-methylpiperidinium bromide was prepared from 6.25 g. of 3-acetamido-1-methylpiperidine and 8.8 g. of ethyl bromide in 50 ml. of isopropanol using the procedure described above in Example 1. After two recrystallizations from acetonitrile there was obtained 6.8 g. of 3-acetamido-1-ethyl-1-methylpiperidinium bromide which softened at 186° C. with an indefinite melting point.

Analysis.—Calcd. for $C_{10}H_{21}BrN_2O$: Br, 30.13; N, 10.57. Found: Br, 30.10; N, 10.53.

EXAMPLE 4

4-Acetamido-1-Ethyl-1-Methylpiperidinium Bromide

A mixture of 4.7 g. of 4-acetamido-1-methylpiperidine and 9.9 g. of ethyl bromide in 30 ml. of isopropanol was refluxed for seven hours. After cooling to room temperature the solution was concentrated to about one-half the original volume and cooled. The product which separated was collected by suction filtration and dried. The filtrate was diluted with anhydrous ether to cause the separation of a solid product melting about 30° lower than the original solid. The two solid products were probably mixtures of cis-trans isomers. The solids were combined and recrystalized from acetonitrile-isopropanol to give 8.5 g. of 4-acetamido-1-ethyl-1-methylpiperidinium bromide which softened at 191° C. and melted indefinitely above 220° C.

Analysis.—Calcd. for $C_{10}H_{21}BrN_2O$: Br, 30.13; N, 10.57. Found: Br, 30.10; N, 10.54.

EXAMPLE 5

3-Acetamido-1-Ethyl-1-Methylpiperidinium Iodide

A mixture of 8.5 g. of 3-acetamido-1-ethylpiperidine and 14.2 g. of methyl iodide in 50 ml. of isopropanol was refluxed for four hours. The excess methyl iodide and solvent were removed by evaporation under diminished pressure to leave 15.6 g. of 3-acetamido-1-ethyl-1-methyl-piperidinium iodide.

EXAMPLE 6

3-Acetamido-1-Ethyl-1-Methylpiperidinium Chloride

To 9.0 g. of hydrogen chloride in 60 ml. of anhydrous methanol was added 15.6 g. of 3-acetamido-1-ethyl-1-methyl-piperidinium iodide and the mixture boiled for one-half an hour. After the hydrogen iodide and solvent were removed there was obtained 11.0 g. of 3-acetamido-1-methylpiperidinium chloride.

EXAMPLE 7

4-acetamido-1-allyl-1-methylpiperidinium chloride can be prepared by heating 4-acetamido-1-methylpiperidine with allyl chloride using the procedure described above in Example 1.

EXAMPLE 8

4-acetamido-1-allyl-1-propylpiperidinium bromide can be prepared by heating 4-acetamido-1-propylpiperidine with allyl bromide using the procedure described above in Example 1.

I claim:

1. A member of the group consisting of lower-alkyl and lower-alkenyl quaternary ammonium salts of compounds having the formulas

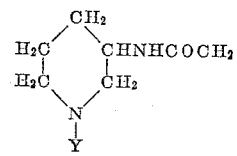

and

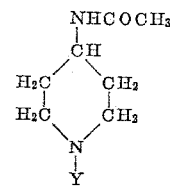

wherein Y is a lower-alkyl radical having from one to three carbon atoms.

2. A lower-alkyl quaternary ammonium salt of a compound having the formula

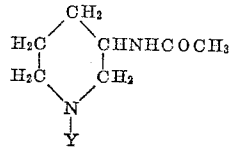

wherein Y is an alkyl group having from one to three carbon atoms.

3. 3-acetamido-1,1-diethylpiperidinium halide.
4. 3-acetamido-1,1-dimethylpiperidinium halide.
5. 3-acetamido-1-ethyl-1-methylpiperidinium halide.
6. 4-acetamido-1-ethyl-1-methylpiperidinium halide.

References Cited in the file of this patent

FOREIGN PATENTS 812,911 Germany _____ Sept. 6, 1951

OTHER REFERENCES

Harries: "Chemical Abstracts," vol. 13, page 1827 (1919).

Tomita: "J. Pharm. Soc., Japan," vol. 71, pages 220–4 (1951).

Tomita: "J. Pharm. Soc., Japan," vol. 71, pages 1053–9 (1951).

Nazarov et al. "J. Gen. Chem. U.S.S.R.," vol. 22, pages 683–90 (1952).

Nazarov et al.: "J. Gen. Chem. U.S.S.R.," vol. 26, pages 1679–89 (1956).

Nazarov et al.: "Zhur Obshchei Khim," vol. 26, pages 1496–1507 (1956).

UNITED STATES PATENT OFFICE
CERTIFICATE OF CORRECTION

Patent No. 3,117,127                      January 7, 1964

Franklyn W. Gubitz

It is hereby certified that error appears in the above numbered patent requiring correction and that the said Letters Patent should read as corrected below.

Column 4, lines 3 and 4, for "3-acetamido-1-methylpiperidinium" read -- 3-acetamido-1-ethyl-1-methylpiperidinium --; lines 20 to 25, for that portion of the formula reading:

$CHNHCOCH_2$      read      $CHNHCOCH_3$

Signed and sealed this 9th day of June 1964.

(SEAL)
Attest:

ERNEST W. SWIDER                     EDWARD J. BRENNER
Attesting Officer                       Commissioner of Patents